Oct. 20, 1925.  1,558,196
E. MAGNUSON ET AL
RECEPTACLE FOR MILK AND BUTTER
Filed July 12, 1923
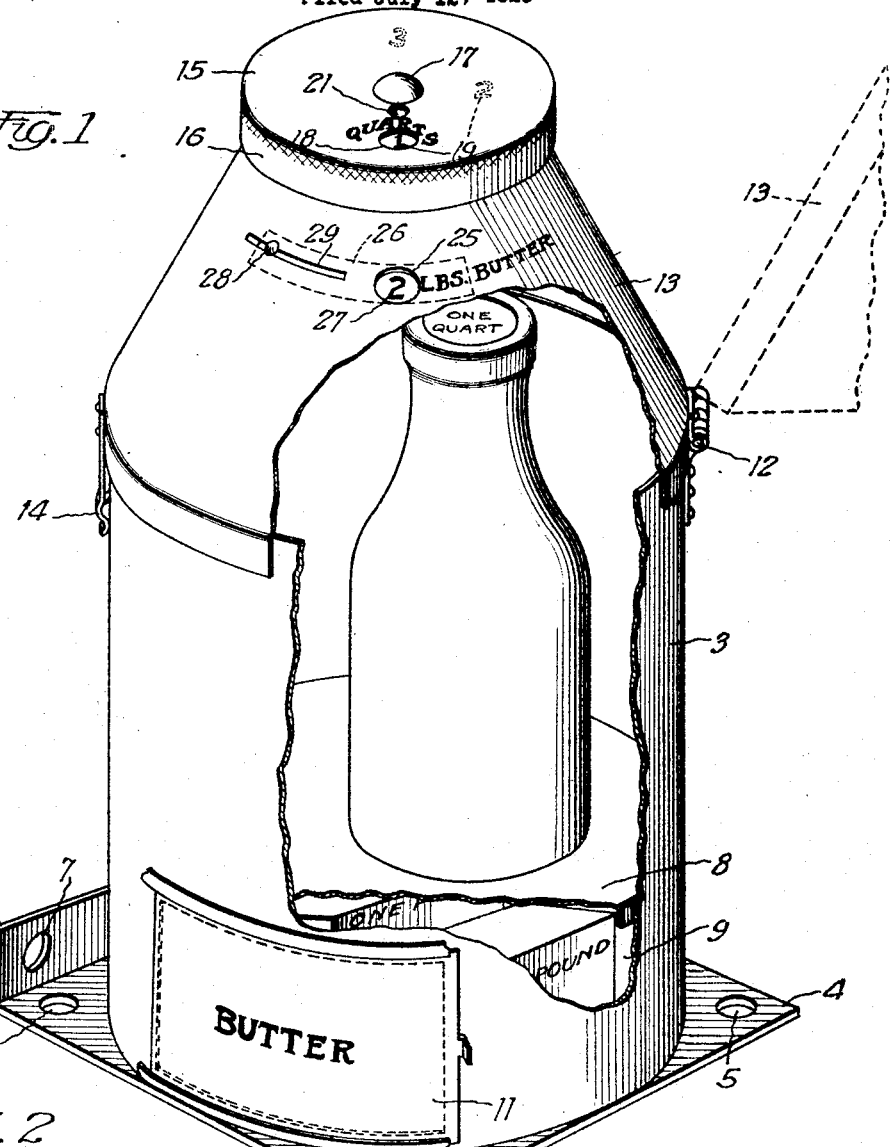
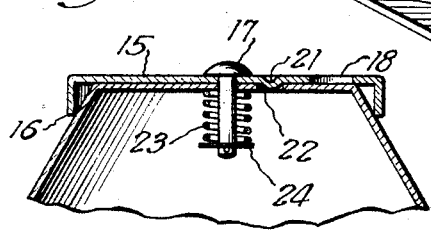

Patented Oct. 20, 1925.

1,558,196

UNITED STATES PATENT OFFICE.

ERNEST MAGNUSON AND MILTON G. SMITH, OF FREEPORT, ILLINOIS.

RECEPTACLE FOR MILK AND BUTTER.

Application filed July 12, 1923. Serial No. 651,030.

*To all whom it may concern:*

Be it known that we, ERNEST MAGNUSON and MILTON G. SMITH, citizens of the United States, residing at Freeport, in the county of Stephenson and State of Illinois, have invented certain new and useful Improvements in Receptacles for Milk and Butter, of which the following is a specification.

Dairy products, such as butter and milk, which are customarily delivered early in the morning, if left on the door step are subject to injury by the heat of the sun and by roving animals; and furthermore, the practice is insanitary.

Our present invention is designed to provide a receptacle in which milk and butter may be deposited by the deliverer, and in which they will be safely kept and preserved until they are removed by the householder.

Another purpose of the invention is to provide in a receptacle of this character indicators by which the householder may designate the quantity of butter and milk desired, and which can be readily seen by the milkman.

A further object is to provide a receptacle which will be substantial and durable, one which will present a pleasing appearance, and which can be securely mounted or fastened upon a convenient support disposed in either horizontal or vertical position.

Other objects and advantages of the invention should be readily appreciated as the same becomes better understood by reference to the following description, when considered in connection with the accompanying drawings.

Referring to the drawings:

Fig. 1 is a perspective view, partially in section, of a receptacle embodying our invention; and Fig. 2 is an enlarged fragmentary sectional view showing one of the indicators.

By reference to the drawings more in detail, it will be observed that our invention comprises a receptacle body 3, preferably of cylindrical shape, mounted upon a base 4 provided with apertures 5 for the reception of fastening screws, and also with a flange 6, having apertures 7 for the reception of screws by which the receptacle may be mounted upon a vertical wall or support, if desired.

Within the receptacle at a suitable distance from the bottom there is provided a horizontal partition 8, forming beneath the same a compartment 9 for the reception of butter, and access to this compartment for the insertion and removal of the butter may be had through a sliding, or if preferred, a hinged door 11.

Upon the receptacle body 3 there is mounted by means of a hinge 12 a cover 13, preferably of truncated form, as shown, adapted to be disposed when in open position in the dotted line position indicated in Fig. 1, and when closed, to be held against accidental opening by a spring latch 14. The compartment above the partition 8 and formed partially by the cover 13, is adapted for the reception of a plurality of milk bottles.

For the purpose of indicating to the milkman the quantity of milk desired, a cap 15, in the form of a disk equipped with a circumferential, depending flange 16, is disposed upon the flat top of the cover, to which it is rotatably secured by a bolt or pin 17. This cap is provided with a sight opening 18, and the top beneath the cap is provided with a series of spaced numerals 19, disposed in an arc concentric with the path of travel of the sight opening so that this opening may be positioned over any numeral to indicate the desired quantity of milk required.

To retain the cap in adjusted position, it is provided on its lower face with a detent 21 adapted to engage in depressions or apertures 22, formed in radial alignment with each of the numerals 19. A coil spring 23 surrounding the pin 17 and disposed between the lower face of the cover top and washer 24 carried by the pin, yieldingly holds the detent 21 in engagement with any aperture over which it is disposed. When adjustment of the cap is desired, this may be effected by grasping the cap and turning the same about the pin 17 as a center. The detent 21, being tapered, will readily disengage itself from its detaining aperture, but to facilitate turning, the cap may be lifted slightly against the force of the spring 23.

To indicate the quantity of butter desired, the cover 13 is provided, preferably on its front side, with a sight opening 25, and upon the inside of the cover there is disposed a slide 26 bearing numerals 27 adapted to be positioned successively beneath the sight opening. The slide may be manipulated by means of a knob 28, projecting outside the cover, the shank of the knob being adapted to travel in a slot 29 formed in the cover.

It will be apparent from the foregoing that we have provided a receptacle by which the quantity of butter and milk desired may be indicated, and by which the products placed therein will be maintained in a sanitary condition without liability of their being destroyed or stolen. The structural details illustrated and described may obviously be varied within considerable limits without exceeding the scope of the invention, as defined in the following claim.

We claim:

A receptacle of the character described, comprising a cylindrical body portion provided with a transverse partition dividing the same into an upper milk bottle compartment and a lower butter compartment, a door through which access may be had to said lower compartment, a truncated cover for said upper compartment hinged at one side thereof, and a cap rotatably mounted on the top of said truncated cover and adapted to be rotatably adjusted to indicate contents of said compartments.

ERNEST MAGNUSON.
MILTON G. SMITH.